United States Patent [19]

Gennaro et al.

[11] Patent Number: 6,009,176
[45] Date of Patent: Dec. 28, 1999

[54] HOW TO SIGN DIGITAL STREAMS

[75] Inventors: Rosario Gennaro, New York; Pankaj Rohatgi, Yorktown Heights, both of N.Y.

[73] Assignee: International Business Machines Corporation, Armonk, N.Y.

[21] Appl. No.: 08/799,813

[22] Filed: Feb. 13, 1997

[51] Int. Cl.$^6$ ............................... H04L 9/00; H04L 9/30

[52] U.S. Cl. ............................... 380/25; 380/23; 380/30; 380/49; 370/522

[58] Field of Search .................... 380/9, 23, 25, 380/29, 30, 37, 43, 49, 50, 59; 370/522, 527, 528

[56] References Cited

U.S. PATENT DOCUMENTS 5,646,997  7/1997  Barton ........................................ 380/23

Primary Examiner—Bernarr E. Gregory
Attorney, Agent, or Firm—Douglas W. Cameron; Anne Vachon Dougherty

[57] ABSTRACT

A method of signing digital streams so that a receiver of the stream can authenticate and consume the stream at the same rate which the stream is being sent to the receiver. More specifically, this invention involves computing and verifying a single digital signature on at least a portion of the stream. The properties of this single signature will propagate to the rest of the stream through ancillary information embedded in the rest of the stream.

11 Claims, 13 Drawing Sheets

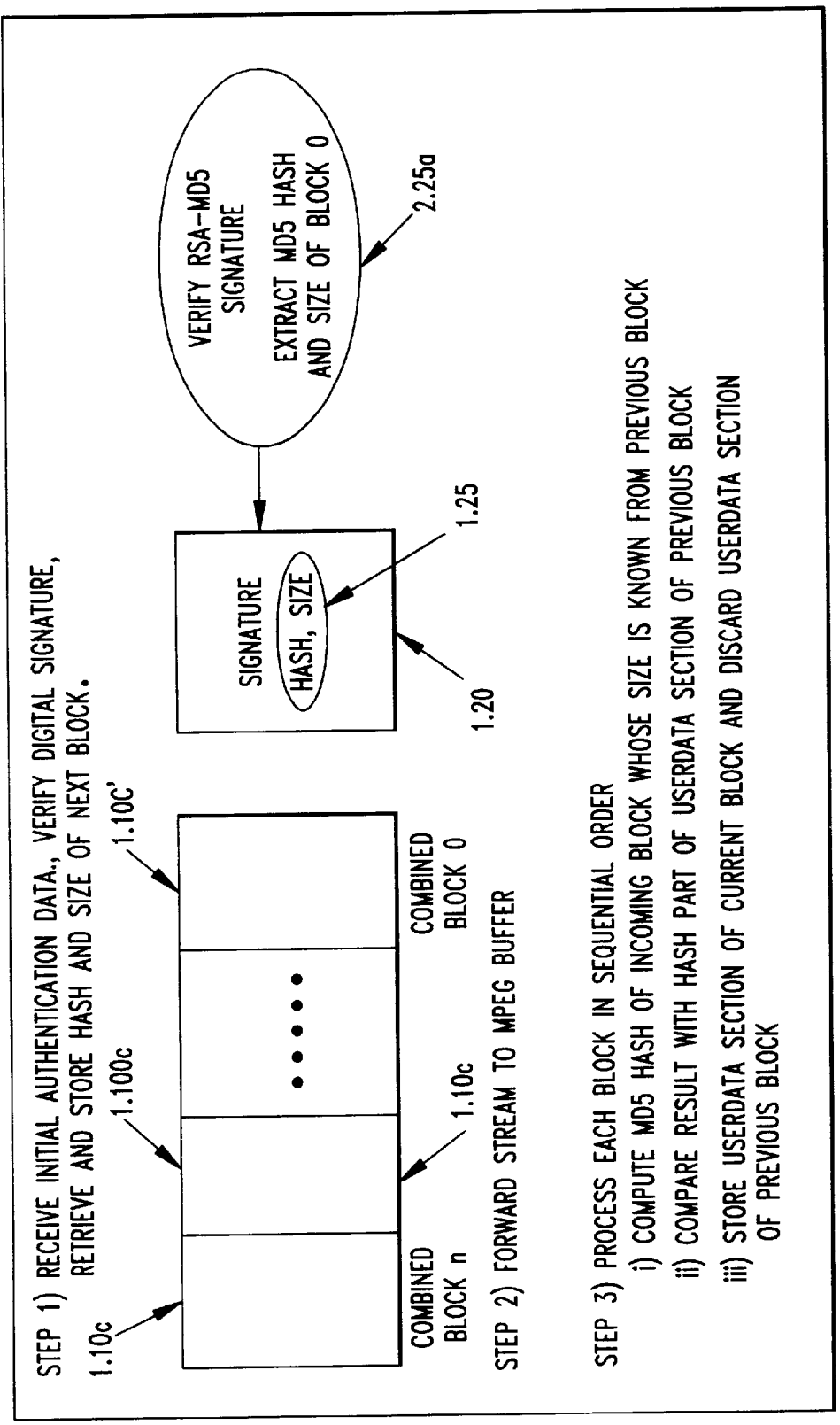

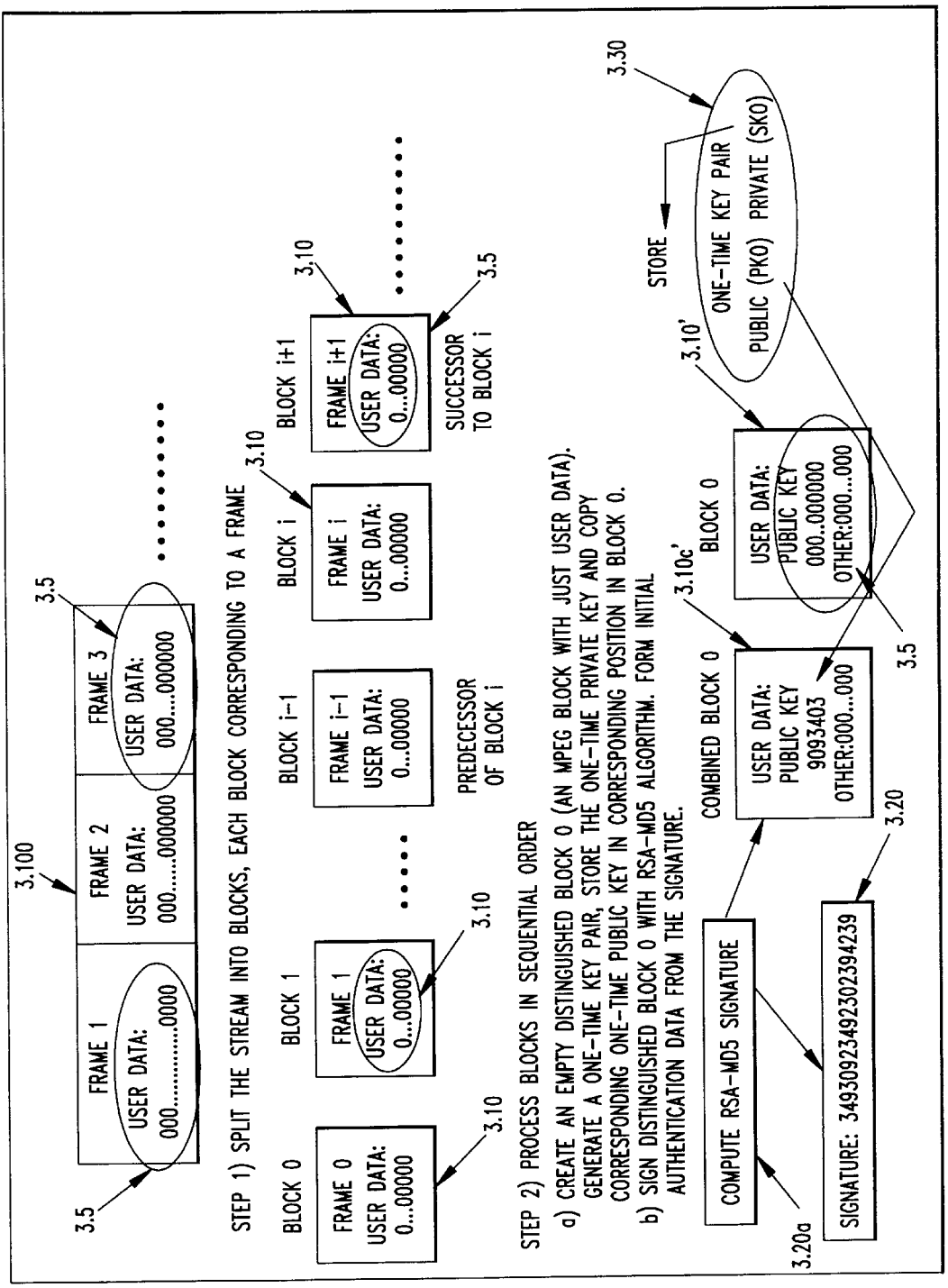

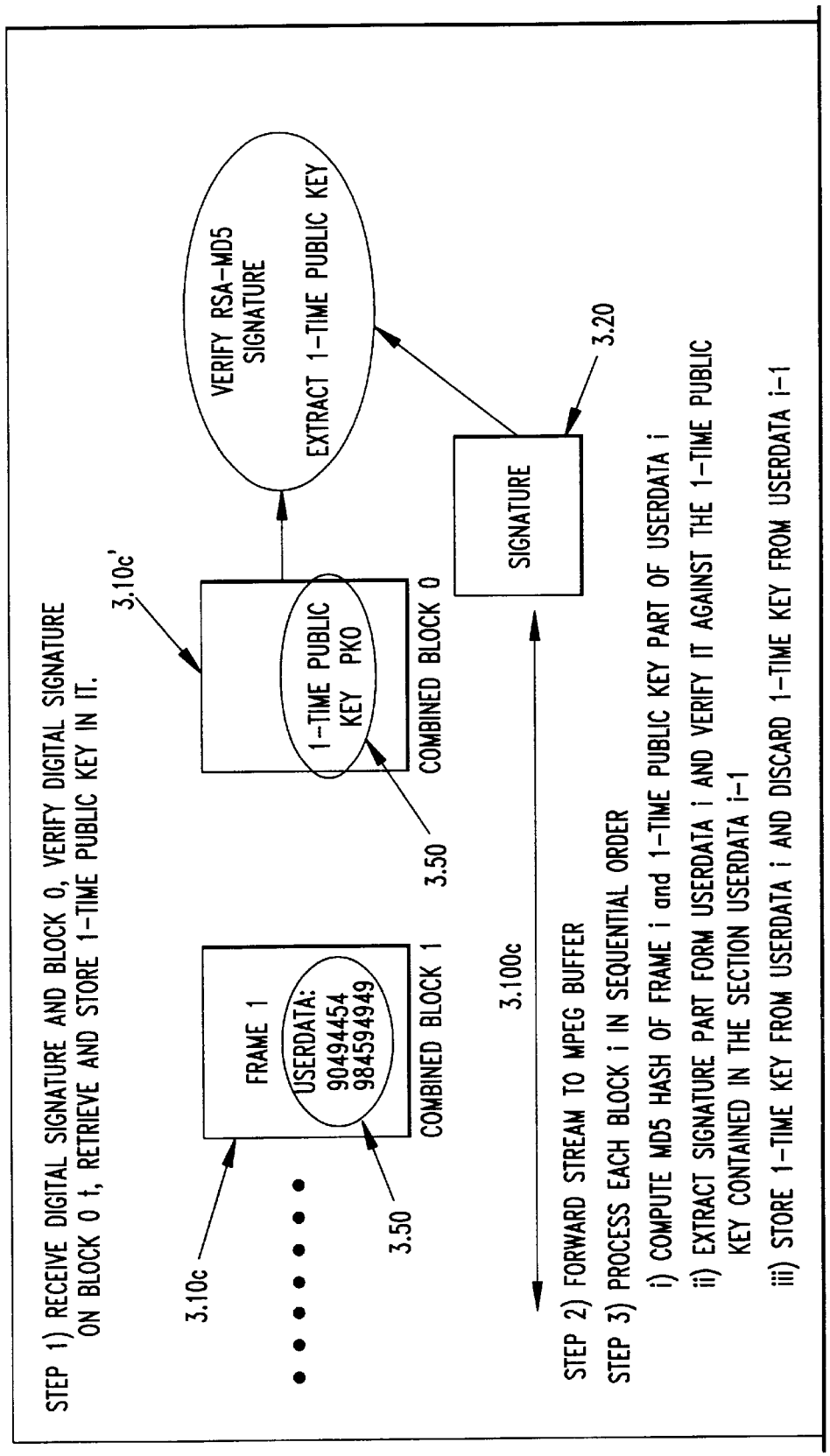

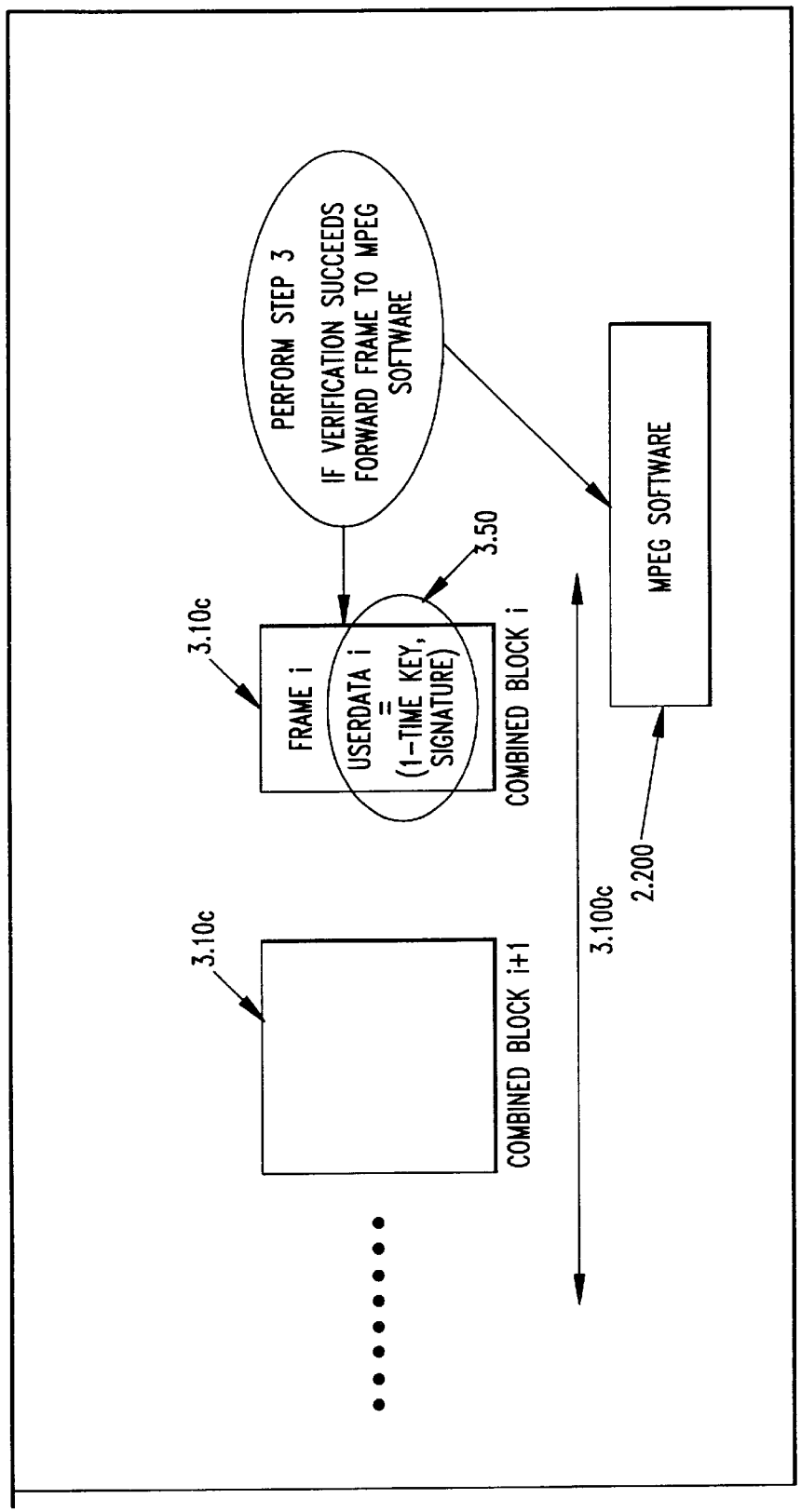

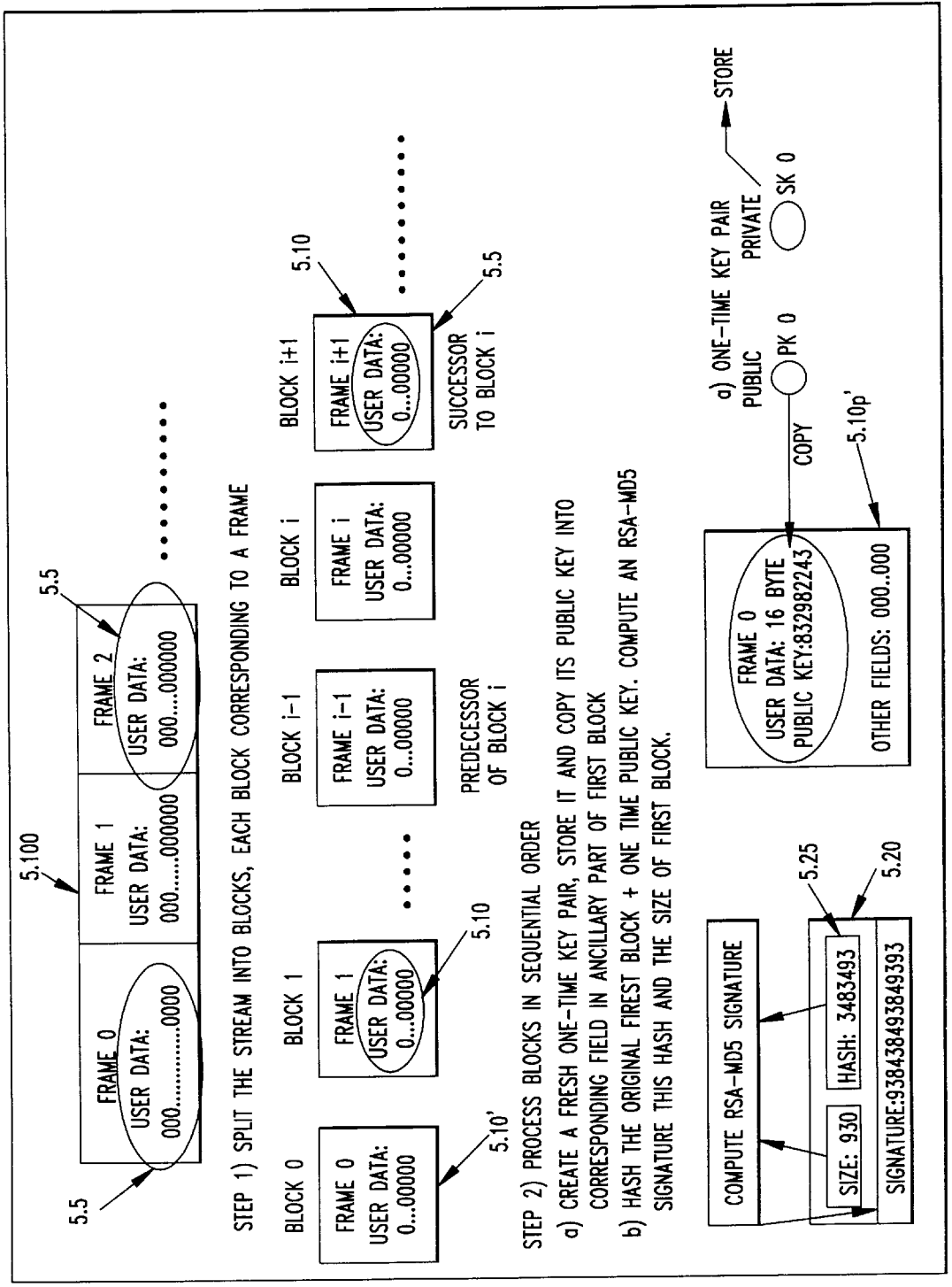

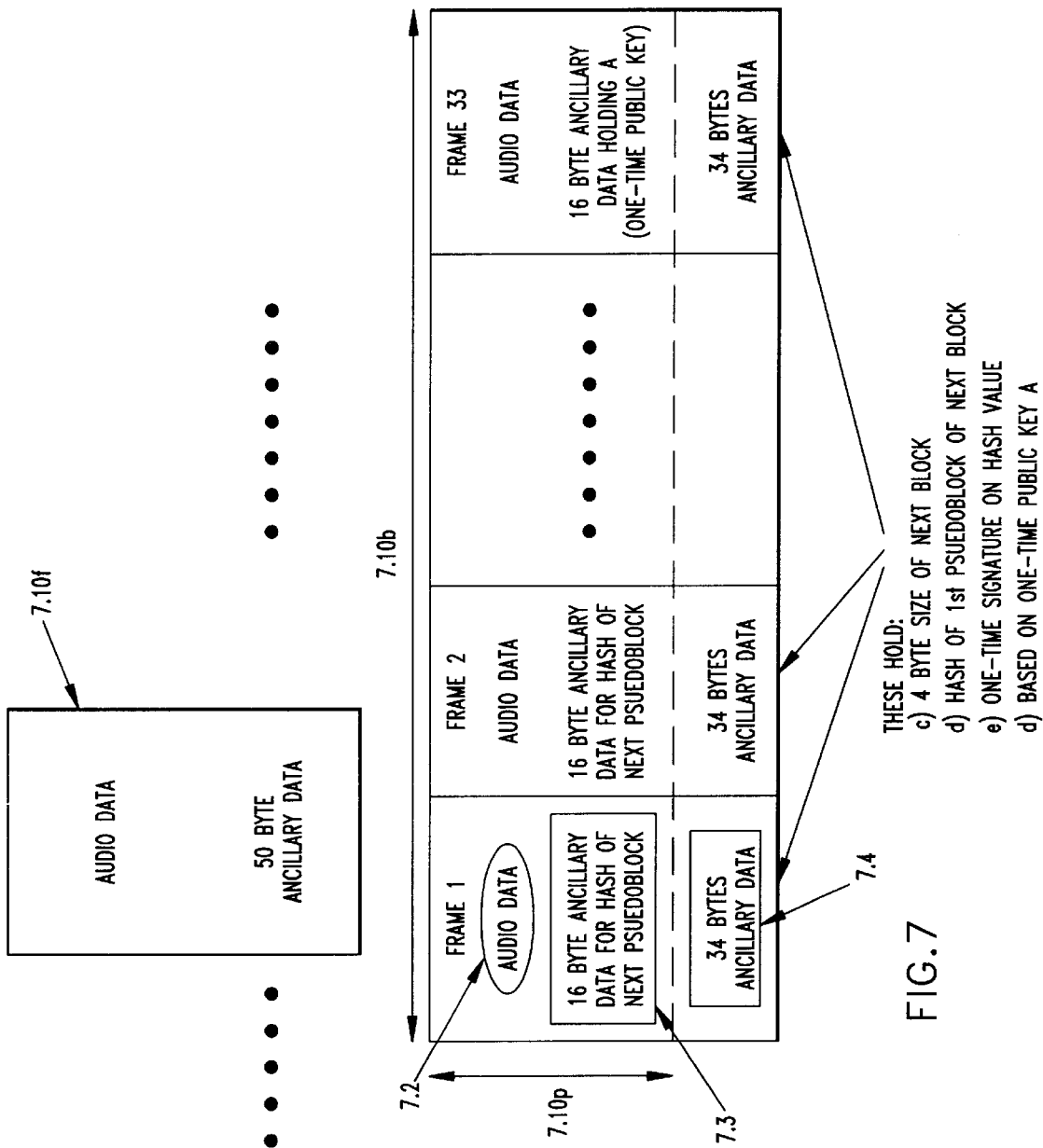

HOW TO SIGN DIGITAL STREAMS

TECHNICAL FIELD

This invention describes a method of signing and authenticating a stream of data using a reduced number of digital signatures.

DESCRIPTION OF THE PRIOR ART

Several prior art solutions envisioned to solve the problem of stream signing and are actually proposed to be have been used in practice.

One solution splits the stream in blocks. The sender signs each individual block and the receiver loads an entire block and verifies its signature before consuming it. This solution also works if the stream is infinite. However this solution forces the sender to generate a signature for each block of the stream and the receiver to verify a signature for each block. With today's signature schemes either one or both of these operations can be very expensive computationally which in turns means that the operations of signing and verifying can create a bottleneck to the transmission rate of the stream.

Another type of solution works only for finite streams. In this case, once again the stream is split into blocks. Instead of signing each block, the sender creates a table listing cryptographic hashes of each of the blocks. Then the sender signs this table. When the receiver asks for the authenticated stream, the sender first sends the signed table followed by the stream. The receiver first receives and stores this table and verifies the signature on it. If the signature matches then the receiver has the cryptographic hash of each of the following stream blocks. Thus each block can be verified when it arrives. The problem with the foregoing solution is that it requires the storage and maintenance of a potentially very large table on the receiver's end. In many realistic scenarios the receiver buffer is very limited as compared to the size of the stream. E.g. in MPEG a typical movie may be 20 GBytes whereas the receiver buffer is only required to be around 250 Kbytes. Therefore the hash table can itself become fairly large (e.g., 50000 entries in this case or 800 Kbytes for the MD5 hash function).The hash table itself has to be stored and this may not be possible. Secondly the hash table itself needs to be transmitted first and if it is too large then there will be a significant delay before the first piece to the stream is received and consumed.

The above solution can be modified by using an authentication tree: the blocks are placed as the leaves of a binary tree and each internal node takes as a value the hash of its children (see [3].) This way the sender needs to sign and send only the root of this tree. However in order to authenticate each following block the sender has to send the whole authentication path (i.e. the nodes on the path from the root to the block, plus their siblings) to the receiver. This means that if the stream has k blocks, the authentication information associated with each block will be O(log k) in size.

It is an objective of the present invention to eliminate all these shortcomings whereby the invention works for both infinite and finite streams, only one expensive digital signature is ever computed, there are no big tables to store, and the size of the authentication information associated with each block does not depend on the size of the stream.

Some of the ideas involved in the solution for unknown streams have appeared previously, although in different contexts and with different usages.

Mixing "regular" signatures with 1-time signatures, for the purpose of improving efficiency is discussed in [4]. However the focus of that invention was to make the signing operation of a message M efficient by dividing such operation in two parts. An off-line part in which the signer signs a 1-time public key with his long-lived secret key even before the messages M is known. Then when M has to be sent the signer computes a 1-time signature of M with the authenticated 1-time public key and sends out M tagged with the 1-time public key and the two signatures. Notice that the receiver must compute two signature verifications: one against the long-lived key to authenticate the 1-time key associated to M, and one against such 1-time key to authenticate M itself In our scheme we need to make both signing and verification extremely fast, and indeed in our case each block (except for the first) is signed (and hence verified) only once with a 1-time key. The first is signed and verified only once with a long-lived key. Old 1-time keys are used in order to authenticate new 1-time keys. This has appeared in several places but always for long-lived keys. Examples include [5,6,7] where this technique is used to build provably secure signature schemes. We stress that the results in [5,6,7] are mostly of theoretical interest and do not yield practical schemes. Our on-line solution somehow mixes these two ideas in a novel way, by using the chaining technique with 1-time keys, embedding the keys inside the stream flow so that old keys can authenticate at the same time both the new keys and the current stream block.

SUMMARY OF THE INVENTION

It is therefore an object of this invention to reduce computation time necessary to sign and authenticate a stream of data by reducing the number of digital signatures required for one to authenticate the data stream. The foregoing is accomplished without having to resort to storing large portions of the data stream and without maintaining excessively large authentication tables. With this invention, the receiver authenticates the stream without receiving the entire stream. Further the receiver detects corruption of the stream almost immediately after tampering of a portion of the stream. As a consequence, the receiver can consume authenticated data from the stream at the same rate he receives such data from the stream.

The present solution makes some reasonable/practical assumptions about the nature of the streams being authenticated. First of all we assume that it is possible for the sender to embed authentication information in the stream. This is usually the case (e.g., USER DATA section in MPEG video elementary stream etc.) We also assume that the receiver has a "small" buffer in which it can first authenticate the received bits before consuming them. Finally we assume that the receiver has processing power or hardware that can compute a small number of fast cryptographic ckecksums faster than the incoming stream rate while still being able to play the stream in real-time.

The basic idea of the present solution is to divide the stream into blocks and embed some authentication information in the stream itself. The authentication information placed in block i will be used to authenticate the following block i+1. This way the signer needs to sign just the first block and then the properties of this single signature will "propagate" to the rest of the stream through the authentication information. Of course the key problem is to perform the authentication of the internal blocks fast.

In the first scenario the stream is finite and is known in its entirety to the signer in advance. This is not a very limiting requirement since it covers most of the internet applications (digital movies, digital sounds, applets). In this case we will show that a single hash computation will suffice to authenticate the internal blocks. The idea is to embed in the current block the hash of the following block (which in turns includes the hash of the following one and so on . . . )

In this first scenario, verification of the find stream is performed by verifying the signature of the first block and subsequently verifying hashes of the following blocks.

The second case is for (potentially infinite) streams which are not known in advance to the signer (for example live feeds, like sports event broadcasting and chat rooms). In this case our solution requires several hash computations to authenticate a block. The idea here is to use fast 1-time signature schemes (introduced in [1,2]) to authenticate the internal blocks. So block i will contain a 1-time public key and also the 1-time signature of itself with respect to the key contained in block i–1. This signature authenticates not only the stream block but also the 1-time key attached to it.

In the second case described above, verification of the signed stream is performed by verifying the long lived signature on the first block, and subsequently verifying the one-time signatures on the following blocks.

BRIEF DESCRIPTION OF THE DRAWINGS

FIG. 1 also illustrates the signing of these combined blocks to form a combined stream which can be used for authentication.

FIG. 4 schematically illustrates the authentication process of a digital stream signed in accordance with FIG. 3.

FIG. 7 schematically illustrates the signature process of FIG. 5 with the exception that the signature bits are split among a plurality of combined data blocks.

DESCRIPTION OF THE PREFERRED EMBODIMENT

Figure 1A:
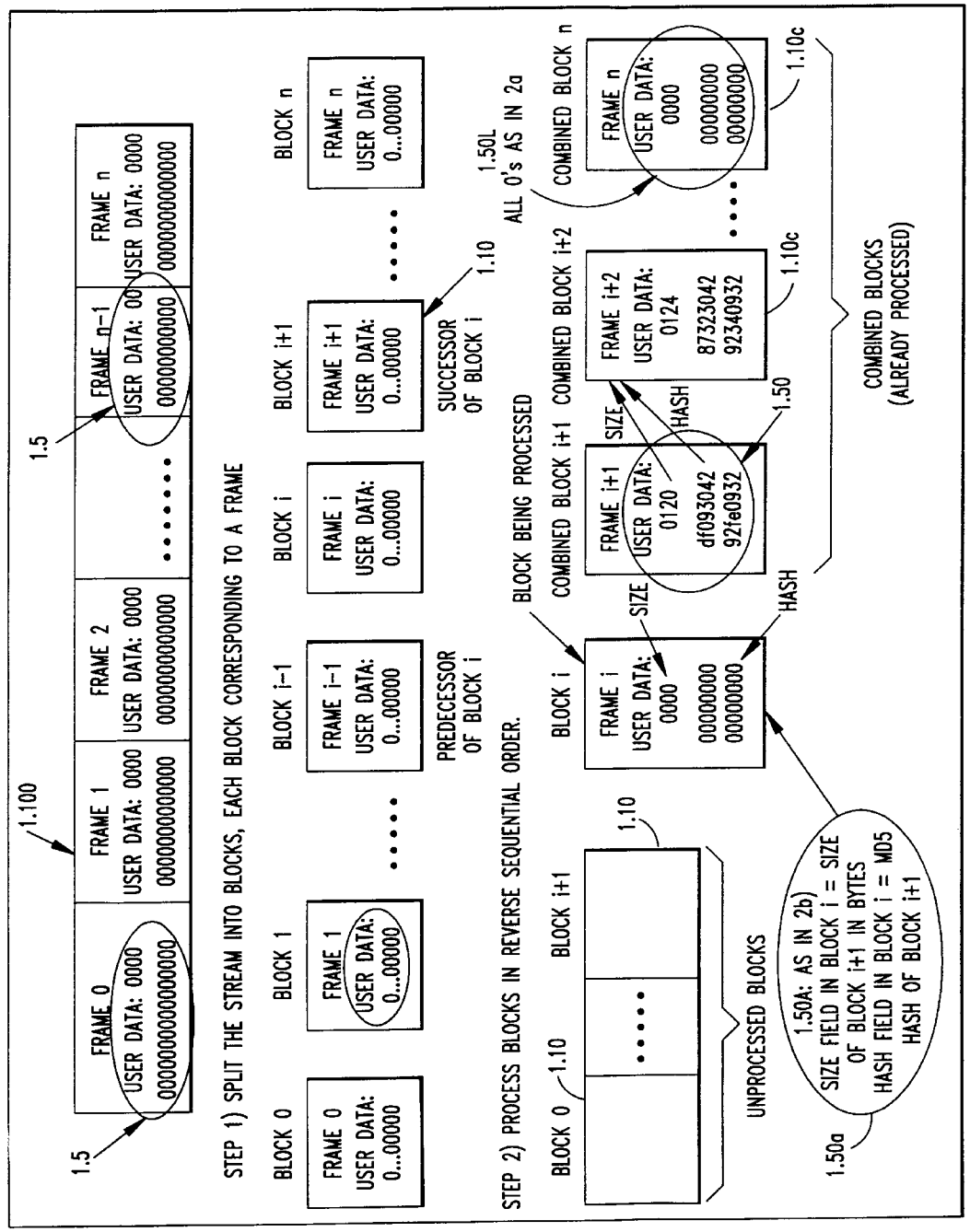
FIG. 1 schematically illustrates a digital stream being divided into a number of blocks, where ancillary information is added to the blocks to form combined blocks.
Figure 1B:
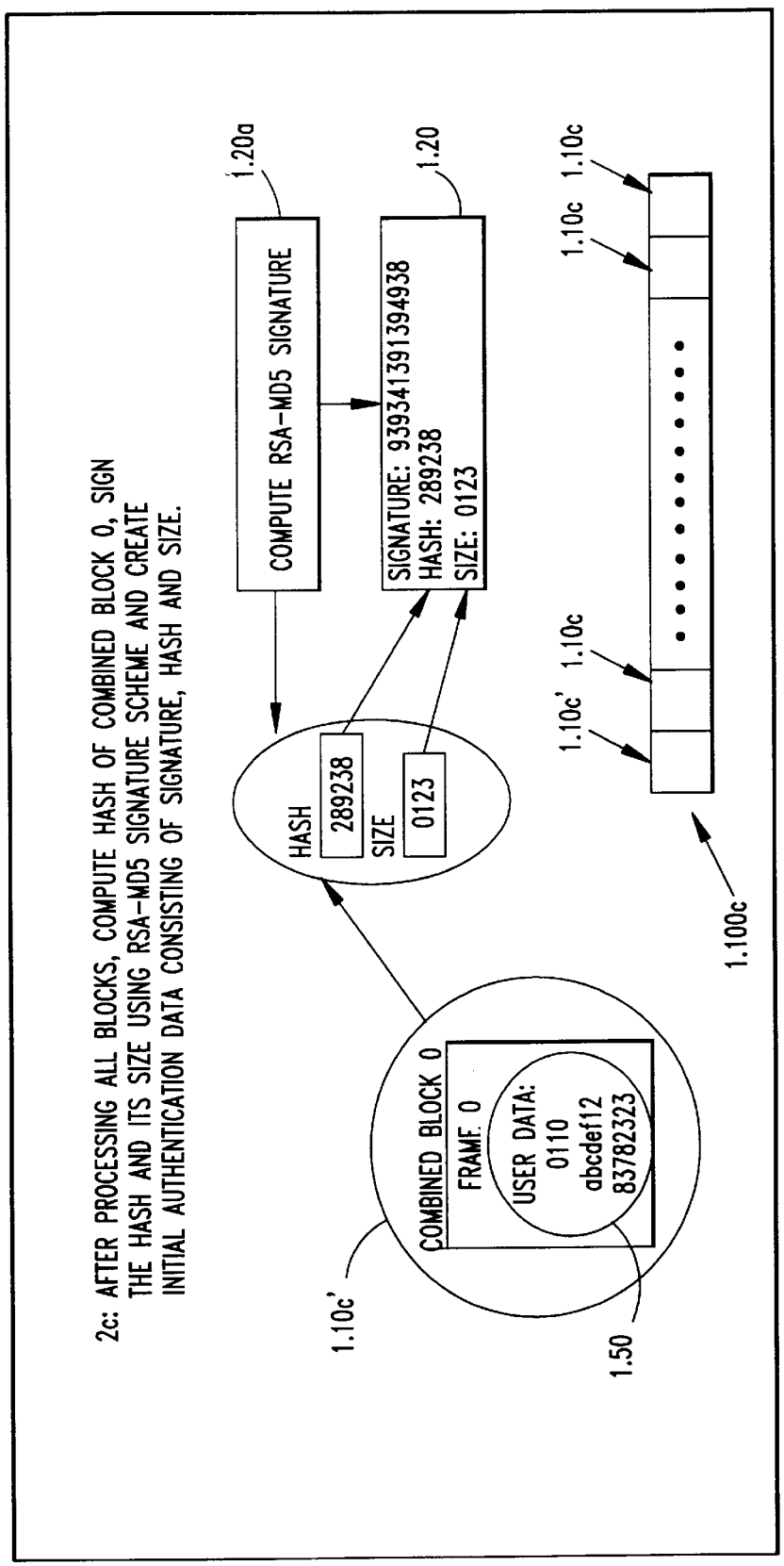
Figure 1:
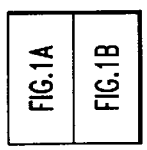

Shown in FIG. 1 is a digital screen 1.100 having n frames. The data stream is then divided into blocks 0 through block n, wherein each block the ancillary data or user data is initially set to all zeros as shown at 1.5. Shown also are the combined blocks I+1 through block n, where each combined block has the ancillary information 1.10C. Block I, which corresponds to frame I, is a block that still needs to be processed, that is ancillary information still needs to be added. Blocks 0 through blocks I–1 are also shown as being unprocessed blocks, which are later to be processed. Finally, in step 2C of FIG. 1, the first block or block 0 is shown as being processed. That is the ancillary information has been added to block 0. At this point, the combined digital stream which can be authenticated is now created.

Embodiment 1
Preferred Embodiment for Signing Streams Known in Advance

The preferred embodiment for authenticating streams known in advance to the sender has been designed to work for MPEG video streams. The following is with reference to FIG. 1. In the MPEG video encoding format, each picture frame allows for a USER-DATA section which can act as a placeholder to hold ancillary information. Moreover MPEG standards define that no frame can be more than 1.8 M-bits in size.

The original MPEG video stream (1.100) is generated such that there is a 20-byte USER DATA 1.5 section in each picture frame which will act as a placeholder for ancillary information. All these bytes are initialized to the value of 0.

The following software process is used to create a combined stream (1.100c) from the original MPEG stream (1.100).

Step 1) The original MPEG stream is partitioned into a sequence of contiguous blocks (1.10) where each block contains a video frame which has a USER-DATA section with 20 bytes holding the value 0 (1.5). Such a partitioning defines an order on the blocks in terms of where they occur in the stream. For any block, define the successor block to be block that immediately follows it in the stream and the predecessor block to be the one that immediately precedes it in the stream. The first block, which contains the first frame is designated at a distinguished block (1.10').

Step 2) The software processes the original stream in reverse sequential order (the last block first) and modifies them by replacing the contents of the USER-DATA section with ancillary information (1.50) to create combined blocks (1.10c). The processing is as follows:

a) The processing of the last block does not change it (see 1.50L of combined block n, i.e., the ancillary information already present in it by default (20 bytes of 0's) is exactly the information that should be there after processing.

b) When the software starts to process a given block, all the blocks which are later in the stream have already been processed and modified to yield combined blocks (1.10c) since the software processes blocks in reverse sequential order. The ancillary information (1.50) for current block is computed by the following algorithm (1.50a).

i) The first four bytes of the 20 byte ancillary information placeholder are updated to hold the size in bytes of the successor block.

ii) The next sixteen bytes of the 20 byte ancillary information placeholder is updated to hold the MD5 cryptographic hash of the successor block. This information can be used to authenticate the the successor block which already has its ancillary information in place.

Upon completion this process ensures that the following properties hold:

i) The combined distinguished block (1.10c') is such that each block in the stream is directly or indirectly authenticated by the hash value stored in the ancillary part of this block (1.50').

ii) For any prefix of the stream, all blocks within it EXCEPT the last incomplete combined block can be authenticated from the hash value in the first block.

c) The hash 1.25 and the size of the combined distinguished block, which is the first of the combined blocks, in the stream (1.10c') is calculated, and the said hash value together with the size of said block is signed using a RSA-MD5 signature scheme (1.20a). The signature, the hash and the size are combined to form initial authentication data (1.20). The combined blocks (1.10c) in sequence now constitute the combined stream(1.100c). The initial authentication data (1.20)

will be sent to the receiver before the combined stream (1.100c) is sent.

Figure 2B:
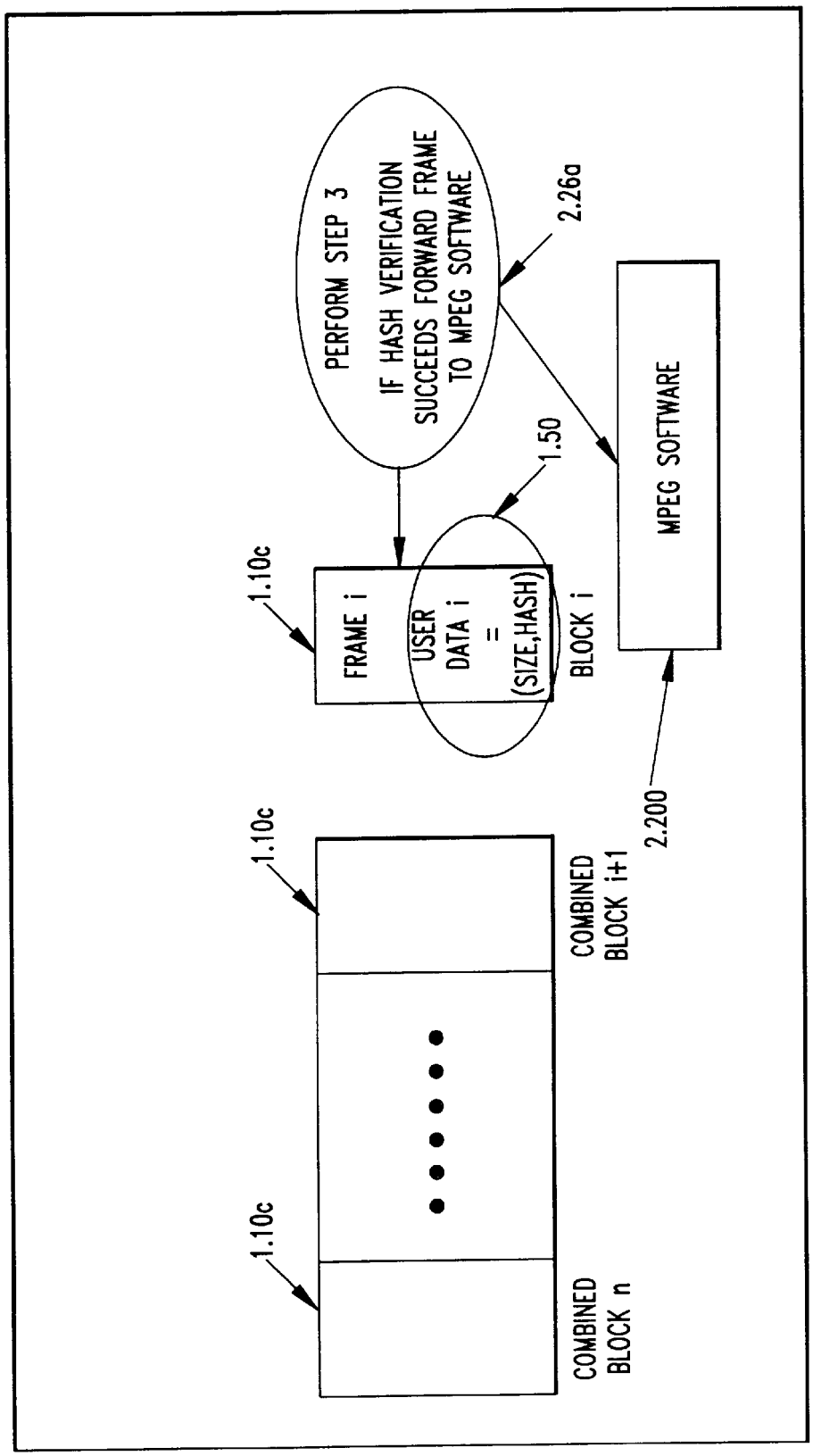
FIG. 2 schematically illustrates the process of authenticating a digital stream signed in accordance with the process of FIG. 1.
Figure 2:
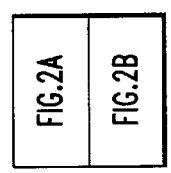

FIG. 2 graphically illustrates how the combined stream previously created is authenticated. The invention requires additional authentication software to be added to any existing MPEG software (2.200) or hardware both of which currently do not do any authentication. The function of this authentication software is to authenticate blocks from the incoming combined stream before passing them on to the MPEG processing software (2.200) to be converted back to video using the MPEG standard. In what follows, the functioning of the additional authentication software is described.

The authentication software shares with the MPEG processing hardware/software 2.200, a bit buffer which is at least 1.8 M-bits in size. In addition this authentication software now controls how the MPEG processing software/hardware is informed of incoming data.

The following constitute the steps that the authentication software follows.

Step 1) Before receiving the combined stream (1.100c) the receiver receives the initial authentication data (1.20) consisting of a digital signature on the hash of the first combined block (1.10c') and the size of first combined block, together with the purported values of the hash and size. The authentication software at this stage does the following (2.25a): It verifies the signature. If the provided signature verifies, then the purported hash and size values of the first combined block (1.10c') are authentic, and the hash and size values 1.25 are extracted out for use in authenticating the combined stream (1.100c).

Step 2) The receiver then receives the combined stream which is forwarded into the MPEG bit-buffer. However the MPEG software is not informed of incoming data before it is authenticated. This prevents the MPEG software to consuming unauthenticated data.

Step 3) The incoming combined stream is split into blocks by the authentication software shown in FIG. 2. This splitting is facilitated by the software always knowing in advance the authenticated size of the next incoming combined block long before the incoming block is fully received. The following algorithm or step (2.26a), which is repeated for all the blocks in the stream, is now applied:

i) Compute the MD5 hash of the incoming bytes as they are transferred into the buffer of the receiver. As soon as a block comes in, its MD5 hash gets computed, and computation of the MD5 hash of the next incoming block is started (although its length is not immediately known).

ii) The MD5 hash of the recently arrived block is compared against what it should be according to the authentication chain emanating from the Digital Signature from (1.20). If it is different, then tampering has been detected and processing halted. Otherwise, the MPEG software/hardware is informed that a block of bits of a certain size representing a frame has arrived and it can proceed to process the incoming original block that was authenticated.

iii) Concurrently with the above, the now authenticated size and hash of the next block stored in the ancillary part of the processed block (1.50) is extracted for use to authenticate the next block.

Embodiment 2
Preferred Embodiment for Signing Streams Not Known in Advance to the Sender
(Variant 1)

As in the earlier embodiment for streams known in advance, the preferred embodiment for authenticating streams has been designed to work for MPEG video streams with the USER-DATA section in each frame acting as a placeholder to hold ancillary information. For this variant (Variant 1) refer to FIG. 3.

The original MPEG stream (3.100) is generated with a USER DATA section having a 16+1088=1104 byte placeholder to store ancillary information (3.5). This placeholder is initialized to be all 0's in the original stream. These 1104 bytes are organized as follows: First 16 bytes is the one time public key to be used to authenticate the following block. Next 1088 bytes which are organized as 136 8-byte values are for holding the one time signature on the MD5 hash of the current original block along with the one-time public key field in its user data section.

The specifics of the one-time signature scheme of Variant 1 used in this embodiment is as follows: A 8-byte to 8-byte one way function F defined as the bitwise exclusive OR of the first and second halves of the MD5 hash of the input.

A one-time key pair is generated by the signer as follows.

Choose 136 random 8-byte values, $V\_1, \ldots, V\_136$. These constitute the private key. The public key is defined as $$MD5(F(V\_1) \| F(V\_2) \| \ldots \| F(V\_136))$$

where $\|$ denotes concatenation of bits.

A signature on a 128 bit value (which corresponds to the MD5 hash of the data being signed) is computed as follows. First append to the 128 bit value a 8 bit value which holds the count of the number of 0 bits in the binary representation of the 128 bit value. This gives a 136 bit value.

For each bit $b\_i$ in this 136 bit value, reveal $A_i = V_i$ if $b\_i$ is 1, otherwise reveal $A\_i = F(V\_i)$. The ordered collection of $A\_1, \ldots, A\_136$ is the signature.

Figure 3B:
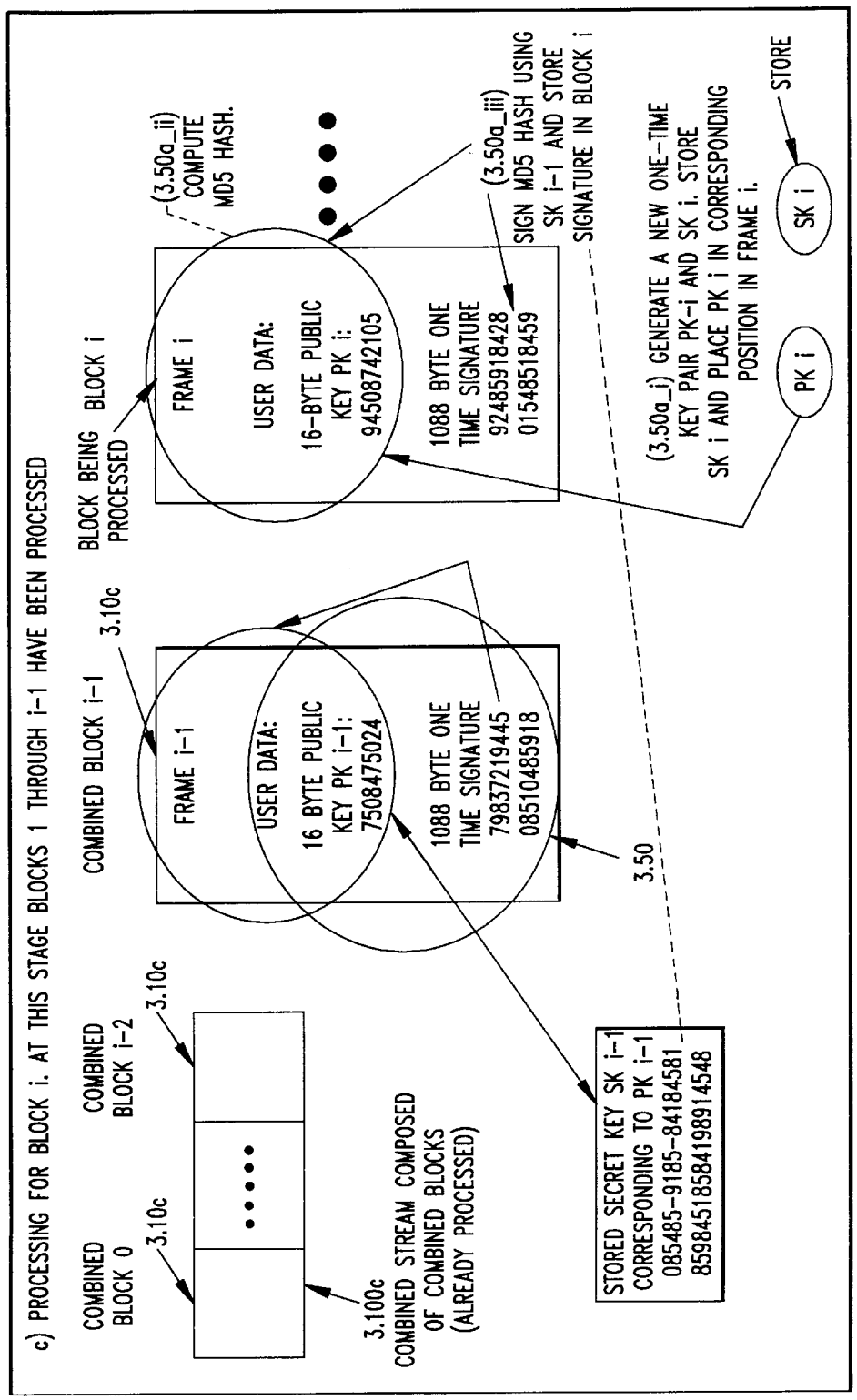
FIG. 3 schematically illustrates the process of signing a stream when future blocks are known in accordance with this invention.

Referring to FIG. 3, the following software process is used to create a combined stream from the original MPEG stream.

Step 1) The original MPEG stream 3.100 is partitioned into a sequence of contiguous original blocks (3.10) (Block 1, Block 2, . . . ), where each original block contains a video frame which has a USER-DATA section with 1104 original bytes all holding the value 0 (3.5). Such a partitioning defines an order on the blocks in terms of where they occur in the stream. For any original block, define the successor block to be block that immediately follows it in the stream, and define the predecessor block to be the one that immediately precedes the original block in the stream.

Step 2) The software processes the original stream in sequential block order to create combined blocks which together constitute the combined stream as follows:

a) An "empty" distinguished block (Block 0) is created (3.10'). This "empty" distinguished block is such that it can be parsed as a valid MPEG frame, but it contains no video data. It does however contain a 1104 byte USER DATA section (3.5), which can hold ancillary information. A one-time key pair 3.30 is produced, and the one-time private key is stored, and its public counterpart is copied into the corresponding position in the USER DATA section of distinguished block 0. This process thus yields the combined block 0 (3.10c').

b) The distinguished combined block 3.10c' is signed using an RSA-MD5 digital signature (3.20a). The resulting signature is the initial authentication data (3.20) which needs to be send to the receiver before sending the combined stream.

c) When the software starts to process a given block i, all the blocks which are earlier in the stream have already been processed since the software processes blocks in sequential order. These blocks (3.10c' and 3.10c) together form the combined stream (3.100c). When processing block i, the predecessor combined block i−1, holds the one-time public key (PK i−1) which will be used to verify the current original block i, along with some of the ancillary information to be placed in it. The ancillary information (3.50) for block i is computed by the following three step algorithm:

(3.50a_i) A new one-time key-pair (PKi, SKi) is generated and the public key PKi is placed in first sixteen bytes of the ancillary information of block i, and the secret key SKi is stored by the signer.

(3.50a_ii) The MD5 hash of the original block i together with said public key in the first 16 bytes of the ancillary data field is computed.

(3.50a_iii) The above result of the hash is signed using the one-time private key (SK i−1) corresponding to the public key (PK i−1) in the predecessor combined block i−1, and the computed signature is placed in the next 1088 bytes of the ancillary data of the current block i. The secret key used in this signature may now be destroyed.

At this point, for the case in which blocks of the stream are not known in advance, the combined stream, which may be later authenticated, is now created.

FIG. 4, which graphically illustrates the authentication of the combined stream whose blocks are not known in advance. As with the first embodiment the invention requires additional authentication software to be added to any existing MPEG software (2.200) or hardware, both of which currently do not do any authentication. The function of this authentication software is to authenticate blocks from the incoming combined stream before passing them on to the MPEG processing software (2.200) to be converted back to video using the MPEG standard. The functioning of this additional authentication software will now be described.

The authentication software shares with the MPEG processing hardware/software, a bit buffer which is at least 1.8 M-bits in size. In addition this authentication software now controls how the MPEG processing software/hardware is informed of incoming data.

The following constitute the steps that the authentication software follows.

Step 1) The receiver first receives initial authentication information (3.20), (That is, the one block the combined stream which is signed using an RSA-MD5 signature.) Then receives the combined block 0 (3.10c') from the stream. The digital signature of combined block 0 is verified, and if it verifies, then the now authenticated one-time public key PK0 stored in its USER DATA section (3.50) is extracted.

Step 2) Then, the receiver receives the next combined block (3.10c) of the combined bit-stream (3.100c) which is forwarded into the MPEG bit-buffer. However, the MPEG software is not informed of incoming data before it is authenticated. This prevents the MPEG software consuming unauthenticated data.

Step 3) This step is repeated for all combined blocks in the incoming stream.

i) The authentication software computes the MD5 hash of the combined block as it comes in to the receiver, except for the 1088 signature bytes present in USER DATA section in the MD5 hash calculation.

ii) As soon as a complete block is completely processed, the signature is extracted from the 1088 bytes in the USER DATA field and it is verified using the public key contained in the predecessor block.

iii) If such verification fails, then tampering has been detected, and the process of receiving the combined stream is halted. Otherwise, the public key within the block is extracted for later use and the MPEG software/hardware is informed that a block has arrived and it can proceed to process that.

Embodiment 3
Preferred Embodiment for Signing Streams Not Known in Advance to the Sender
(Variant 2)

As in the previous embodiment, this embodiment for authenticating streams not known in advance to the sender has been designed to work for MPEG video streams with the USER-DATA section in each frame acting as a placeholder to hold ancillary information. It uses exactly the same hashing, signing and one-time signature scheme as the previous embodiment, the only difference is that in this scheme the one-time signature present in the ancillary portion of a block is for the hash value of the next block (as opposed to the current block). This variant requires a more complex processing strategy for the signer and an easier verification strategy for the receiver.

Figure 5:
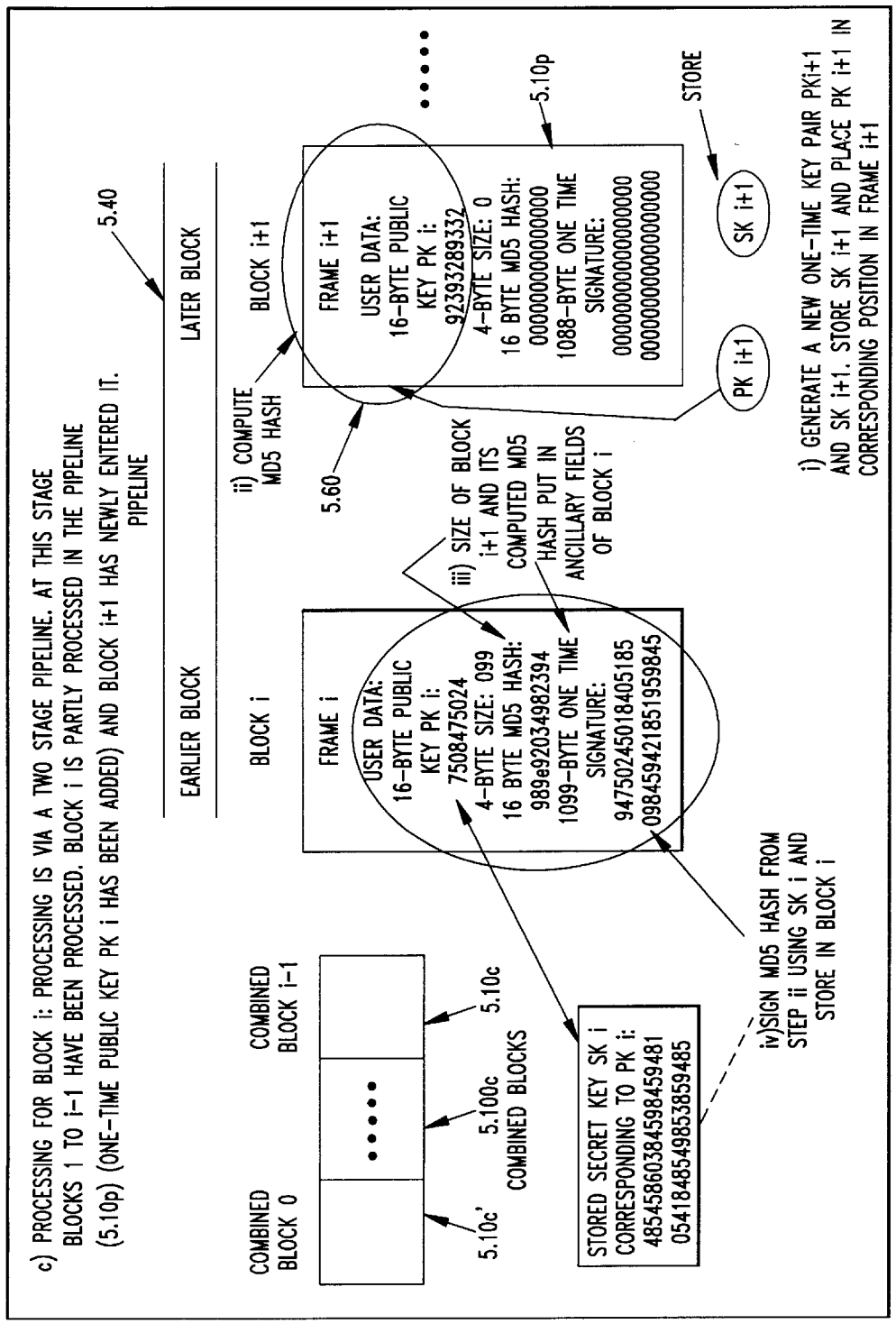
FIG. 5 is the process of signing a digital stream combining the techniques of FIGS. 1 and 3.

For Variant 2 refer to FIG. 5, which is described below.

The original MPEG stream (5.100) is generated with a USER DATA section having a 16+4+16+1088=1124 byte placeholder to store ancillary information (5.5), which is initialized to be all 0's in the original stream. These 1124 bytes are organized as follows: The first 16 bytes is the one time public key to be used to authenticate the following block. The next 4 bytes hold the size in bytes of the next block. The following 16 bytes hold the $MD_5$ hash of parts of the successor block and the next 1088 bytes which are organized as 136 8-byte values are for holding the one time signature on the 16 byte $MD_5$ hash claimed in the predecessor block.

The following software process is used to create a combined stream (5.100c) from the original MPEG stream (5.100) described above.

Step 1) The original MPEG stream is partitioned into a sequence of contiguous blocks where each block (5.10) contains a video frame which has a USER-DATA section with 1124 bytes holding the value 0. Such a partitioning defines an order on the blocks in terms of where they occur in the stream. For any block, define the successor block to be block that immediately follows it in the stream and the predecessor block to be the one that immediately precedes it in the stream. The first block is considered to be a distinguished block (5.10').

Step 2) The software processes the original stream (5.100) in sequential block order as follows:

a) A fresh one-time key pair PK0 and SK0 is produced and stored and its public part PK0 is placed in its designated location in the ancillary part of the first block. At this stage, the first block is partially processed (5.10p').

b) The original first block together with PK0 contained within its ancillary part is hashed using MD5. See 5.25. This hash value, together with the size of first block, is signed using the RSA-MD5 signature scheme (in essence this is a signature on the "distinguished" first block along with extra information such as size). Said signature, the said hash and said size information constitute the initial authentication data (5.20) which needs to be sent to the receiver before the combined stream.

c) The blocks are processed in a pipelined fashion 5.40, with two blocks in a pipeline at a time. The two blocks in the pipeline consists of an earlier block which entered the pipeline earlier and a later block which entered the pipeline later. The processing is done in stages in which each stage except the first starts by removing from the pipeline the earlier block and outputting it as part of the processed combined stream, moving the later block in the position of the earlier block and loading the next block from the original stream in the place vacated by the erstwhile later block which is now an earlier block and the newly loaded block becomes the later block. The first stage is started by putting the first block processed as in step a 5.10$p$ a) in place of the earlier block and the second unprocessed block as the later block. After this, the rest of the stage proceeds as follows, Assume that Blocks 0 thru i−1 have been processed to yield combined blocks (5.10$c$) 0 thru i−1 which together form a prefix of the combined stream (5.100$c$). Block i is the earlier block in the pipeline and Block i+1 is the later block. The following describes what is accomplished in a single cycle of the pipeline. This results in the complete filling up of the ancillary section of Block i (5.50) to yield a Combined block (5.10$c$) and the partial filling of the ancillary section of Block i+1 resulting in a partially processed block (5.10$p$). See Bottom right side of FIG. 5.

i) A fresh one-time key pair PKi+1 and SKi+1 is produced and stored by the signer and its public part PKi+1 is copied in its designated location in the ancillary part of Block i+1.

ii) An MD5 hash is computed on the following parts of the Block i+1: (See 5.60.)
  A) the original part of the block.
  B) the public key placed in it as described above in i)

iii) The size of the Block i+1 and the computed $MD_5$ hash (as in ii) is placed in the corresponding fields in the ancillary part of Block i.

iv) The secret one-time key corresponding to the public key (PKi) Block i (i.e., SKi) is used to generate a one-time signature on the Hash value computed in step (ii) which has also been placed in the corresponding position in Block i in step iii). This one-time signature is then stored in the corresponding field in the ancillary part 5.50 of Block i. At this time the one-time private key used in the signature may be discarded by the signer.

At this point, the piped line process of creating a combined stream, which can be authenticated, is now completed. As with the previous embodiment the invention requires additional authentication software to be added to any existing MPEG software (2.200) or hardware which currently do not do any authentication.

Figure 6A:
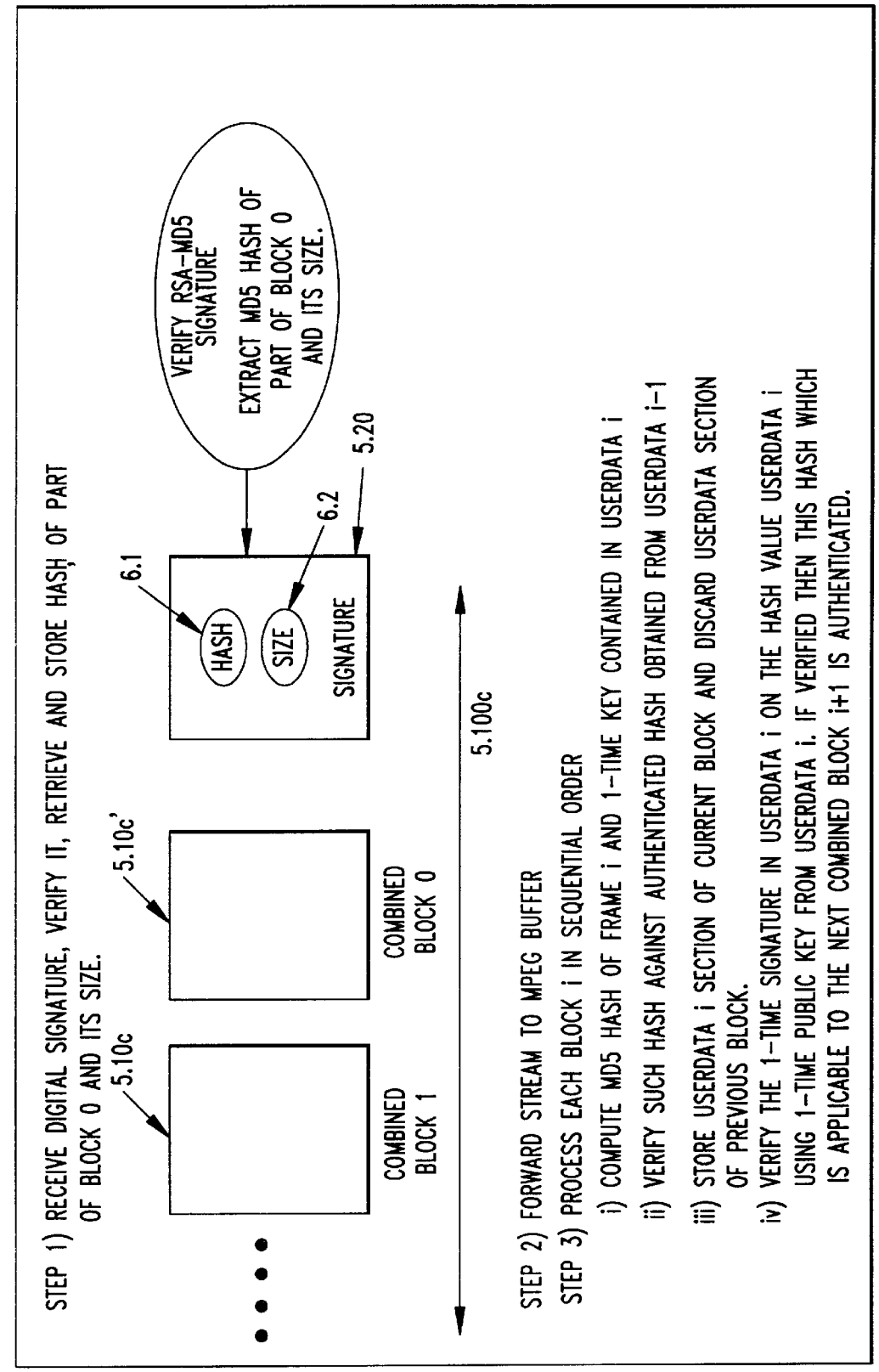
FIG. 6 schematically illustrates the authentication process associated with FIG. 5.
Figures 6, 6B:
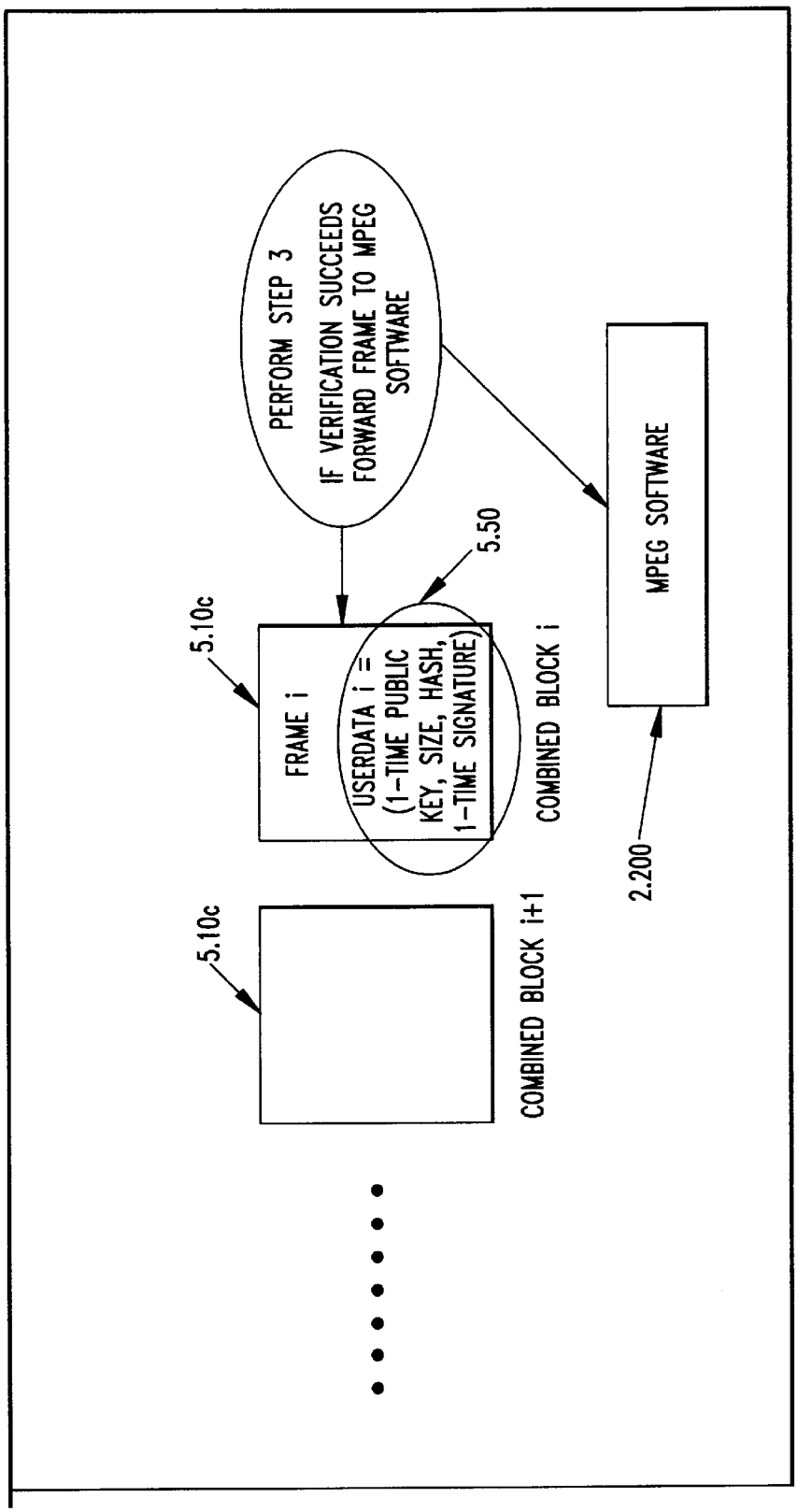

The authentication process the receiver end for the above combined stream is described in FIG. 6 below. The function of this authentication software is to authenticate blocks from the incoming combined stream before passing them on to the MPEG processing software (2.200) to be converted back to video using the MPEG standard. In what follows the functioning of the additional authentication software is described.

The authentication software shares with the MPEG processing hardware/software, a bit buffer which is at least 1.8 M-bits in size. In addition this authentication software now controls how the MPEG processing software/hardware is informed of incoming data.

The following constitute the steps that the authentication software follows.

Step 1) Before receiving the combined stream (5.100$c$) the receiver receives the initial authentication data (5.20) consisting of a digital signature on the purported hash value computed on the first original block and the public key in the ancillary part of the first combined block and the purported size of the first combined block. This signature is verified, and if it is authentic then the hash value 6.1 of part of the first combined block 5.10$c'$ and the size 6.2 of the first combined block are authenticated and these are extracted for future use.

Step 2) Then the receiver receives the combined bitstream which is forwarded into the MPEG bit-buffer. However the MPEG software is not informed of incoming data before it is authenticated. This prevents the MPEG software to consuming unauthenticated data.

Step 3) This step is repeated for all the blocks in the stream.

i) The authentication software computes the MD5 hash of the incoming bytes as they are transferred into this buffer, ignoring the length, hash and signature fields in its ancillary part.

ii) As soon as the full block (5.10$c$ or 5.10$c'$) is in the buffer, its MD5 hash gets computed, and computation of the MD5 hash of the next incoming block is started. The MD5 hash of the relevant parts of the recently arrived block is compared against what it should be according to the authentication chain emanating from the Digital Signature. If the value resulting from the MD5 hash is different, then tampering has been detected, and the process halted. Otherwise, the MPEG software/hardware is informed that a block of bits of a certain size has arrived and it can proceed to process that.

iii) Simultaneously, the public key, length, hash and one-time signature (5.50) are extracted from the combined block 5.10$c$.

iv) The public key is already authenticated since it was included in the MD5 hash. Using this public key, the one-time signature is checked against the hash field. If it verifies, then the signer has claimed that such hash is the hash of the next block. The length field is informational, since it makes the processing easier for the receiver without compromising security.

v) If the signature check fails then tampering has been detected and appropriate action taken.

Embodiment 4

This embodiment, which is a hybrid of embodiments 1 and embodiment 3, is useful in several situations, an example of which is MPEG audio.

The audio stream is not known to the sender in advance.

Without knowledge of future blocks, the sender must use a scheme like embodiment 2 or 3. Note that this scheme requires more than 1000 bytes of ancillary information per block, and the receiver must have space to buffer at least one block before forwarding it for processing.

The audio stream has its own logical structure consisting of audio frames which allows it to be consumed in very small pieces (say 1000 bytes at a time). The receiver therefore has a buffer of only a few thousand bytes (say 2500 bytes).

The problem that now arises is that in the transmitted bytes only 5% or so could reasonably be allocated for ancillary information. Definitely it is not a good idea to put 1000 bytes of ancillary information into a single audio frame because when these bytes are send, the receiver does not get any actual data bytes to process which may have adverse effects (discontinuity in the audio).

Referring now to FIG. 7, the case of MPEG audio, the size of an audio frame is fixed within a stream but the size depends on the bit-rate of the audio stream and the type of encoding performed on it (e.g., MPEG I Layer I or II, the sampling frequency, whether the input is stereo or mono etc). Therefore, we illustrate this embodiment on a hypothetical MPEG audio stream in which each audio frame is 1000 bytes where 50 bytes of these bytes can hold ancillary information (7.10f). The parameters in the method described below can easily be modified by those with ordinary skill in the art, to work with each of the actual frame sizes that occur for MPEG audio.

To deal with the above situation a scheme which is a hybrid of schemes 1 and 3 is described below. As in scheme 3 the input stream is divided in blocks. To paraphrase the construction of scheme 3, each block would consist of the following parts:

a) audio data 7.2, b) 16-byte one time public key 7.3 used to verify 7.3. c) 4-byte size of next block, d) 16-byte hash of parts a) and b) of the next block, and e) 1088-byte one-time signature on part d) verifiable by using part (b).

Also, the above named parts c) d) and e) (See 7.4) are useful in authenticating the next block and do not participate in the authentication of the current block.

The original audio stream is split into original blocks each having a size of 33000 bytes (7.10b). Notice that even one such block cannot be stored in the receiver's memory which is limited to 2500 bytes. However, in 33000 bytes we can have 33000*5%=1650 bytes of ancillary information which is more than sufficient for our needs. The 33000 bytes also consists of 33 audio frames. Each such frame can hold 50 bytes of ancillary information. The key idea in the hybrid construction is that we can treat the audio frame with 16 out of 50 bytes of ancillary information as a psuedoblock (7.10p) and the 33 audio frames along with 16 bytes of ancillary information each, form a finite stream of psuedoblocks as required by the embodiment 1 and using the construction specified in embodiment 1, this finite stream of 33 psuedoblocks can be authenticated by authenticating its first psuedoblock. There are only two minor differences in this hybrid construction. In the original construction the size of the next block was stored in the ancillary section, however in this case since all psuedoblocks are of the same length this field is not needed so only 16 bytes of ancillary information which are enough to store an MD5 hash are required. Also, in the original construction of embodiment 1, the ancillary section of the last block was kept as all 1's. However, in this construction it will hold the 16-byte one time public key as described in b) above. With this modification, the property that holds is that authenticating the first psuedoblock implies authentication of all 33 psuedoblocks and of the 16 byte one-time public key kept in the ancillary part of the last psuedoblock. With this construction, we still have 34 bytes of unused ancillary information in each audio frame which was not included in the psuedoblock processing. We use these 34 bytes to spread parts c) d) and e) of the construction of embodiment 3. The parts account for a total of 1108 bytes whereas 34*33=1122 bytes are available so space is adequate. The only difference between this scheme and the one described in embodiment 3 is that the hash field d) is the hash of the first psuedoblock in the next block rather that the hash of the next block together with the one-time public key. However, note that our hybrid construction, which uses a slight variant of embodiment 1, guarantees that the hash of the first psuedoblock is sufficient to authenticate all the data in the frames as well as the one-time public key a) kept in the last psuedoblock.

On the receiver end using this hybrid process, the authentication software performs steps from both the authentication scheme for embodiment 3 as well as the authentication scheme for embodiment 1.

The authentication software first verifies a digital signature exactly as in embodiment 3.

When the software encounters the start of a new block of 33000 bytes, it already knows what the hash of the first psuedoblock is. This hash is verified as the psuedoblock comes in. Upon verification, the psuedoblock is forwarded to the MPEG audio processing software, and the hash of the next psuedoblock is extracted from it. Simultaneously, parts c), d) and e) present in the ancillary section of the frame outside the psuedoblock are extracted and stored. The psuedoblocks as they come in are authenticated, as in embodiment 1 (except that the size field is not there and all psuedoblocks are of the same known size). The last psuedoblock yields the authenticated one-time public key in part b) and when the entire block is processed, the receiver also has the complete 1108 byte information constituting parts c), d) and e) of the scheme from embodiment 3. Then exactly as in embodiment 3, the one-time signature e) on hash d) is verified using public key in part b) whence the receiver gets to know the authentic value of the hash of the first pseudoblock in the next block of 33000 bytes.

Notice that the receiver in this case needs to store at most 1 unauthenticated psuedoblock and to store data corresponding to parts b) c) d) and e) for a total of at most 1000+ 1124=2124 bytes which is well within its 2500 byte capacity. While in the above embodiments specific signature schemes such as RAS-MD5 were implemented, any secure signature scheme may be used. Also, any collision resistant hash function may be used in lieu of MD5. Further, any stream-like application can be used. Flowever, RSA is the most widely used signature scheme, and MD5 is the shortest hash function used in a signature scheme. MPEG is the most suitable application for the embodiments of this invention.

As described earlier, the main applications of the present invention are for audio, video and data streams as well as applets in an internet/interactive TV environment. We briefly describe the specifics of how these techniques are applicable for MPEG audio/video and java applets. Later we also describe how our construction carries over to a broadcast environment and how in could be useful in non-stream settings.

MPEG VIDEO AND AUDIO. In the case of MPEG video and audio, there are several methods for embedding authentication data. Firstly the Video Elementary stream has a USER-DATA section for putting arbitrary user defined information and this section could be embedded in each frame (or field). Secondly, the MPEG system layer allows for an elementary data stream to be multiplexed synchronously with the packetized audio and video streams. One such elementary stream could carry the authentication information. Thirdly, techniques borrowed from digital watermarking can be used to embed information in the audio and video itself at the cost of slight quality degradation. In the case of MPEG video since each frame is fairly large, (hundreds of kilobits) and the receiver is required to have a buffer of at least 1.8 Mbits, both the off-line as well as the on-line solutions can be deployed without compromising picture quality. In the case of audio however, in the extreme case the bit rate could be fairly small (e.g., 32 Kbits/s) and each audio frame can also be small (a few hundred kilobytes) and therefore the receiver's audio buffer could also be very small (3–4 Kbytes). In such extreme cases a direct application of the on-line method, which requires around 1000 bytes of authentication information per block, where a block is limited by the size of the receiver's audio buffer would seriously cut into the audio quality. For these extreme cases, the best on-line strategy would be either to send the authentication information via a separate but multiplexed MPEG data stream. If the receiver has a good sized buffer (say 32 K) then by having a large audio block (say 20 K) our method yields a scheme which has a server-introduced delay of approximately 5–6 seconds and a 5% quality degradation. If the receiver buffer is really tiny (say 2–3 K) a hybrid scheme is required: as an example of a scheme that can be built one could use groups of 33 hash-chained blocks of length 1000 bytes each; this has a 5% degradation and a server initial delay in the 20second range. JAVA. In the original version of java (JDK 1.0), for a applet coming from the network, first the startup class was loaded and then additional classes were (down) loaded by the class loader in a lazy fashion as and when the running applet first attempted to access them. Since our ideas apply not only to streams which are a linear sequence of blocks but in general to trees as well (where one block can invoke any of its children), based on our model, one way to sign java applets would be to sign the startup class and each downloaded class would have embedded in it the hashes of the additional classes that it downloads directly. However for code signing, Javasoft has adopted the multiple signature and hash table based approach in JDK1.1, where each applet is composed of one or several Java archives, each of which contains a signed table of hashes (the manifest) of its components. It is our belief that once java applets become really large and complex the shortcomings of this approach will become apparent:

Large size of the hash table in relation to the classes actually invoked during a run. This table has to fully extracted and authenticated before any class gets authenticated.

The computational cost of signing each of the manifests if an applet is composed of several archives.

Accommodating classes or data resources which are generated on the fly by the application server based on a client request.

These could be addressed by using some of our techniques. Also the problem of how to sign audio/video streams will have to be considered in the future evolution of Java, since putting the hash of a large audio/video file is not an acceptable solution.

Broadcast Applications

Our schemes (both the off-line and the on-line one) can be easily modified to fit in a broadcast scenario. Assume that the stream is being sent to a broadcast channel with multiple receivers who dynamically join or leave the channel. In this case a receiver who joins when the transmission is already started will not be able to authenticate the stream since she missed the first block that contained the signature. Both schemes however can be modified so that every once in a while apart from the regular chaining information, there will also be a regular digital signature on a block embedded in the stream. Receivers who are already verifying the stream via the chaining mechanism can ignore this signature whereas receivers tuned in at various time will rely on the first such signature they encounter to start their authentication chain. A different method to authenticate broadcasted streams, with weaker non-repudiation properties than ours, was proposed in [8].

Long Files When Communication is at Cost

Our solution can be used also to authenticate long files in a way to reduce communication cost in case of tampering. Suppose that a receiver is downloading a long file from the Web. There is no "stream requirement" to consume the file as it is downloaded, so the receiver could easily receive the whole file and then check a signature at the end. However if the file has been tampered with, the user will be able to detect this fact only at the end. Since communication is at a cost (time spent online, bandwidth wasted etc) this is not a satisfactory solution. Using our solution the receiver can interrupt the transmission as soon as tampering is detected thus saving precious communication resources.

The invention has been described with reference to several specific embodiments. One having skill in the relevant art will recognize that modifications may be made without departing from the spirit and scope of the invention as set forth in the appended claims.

References

1. L. Lamport. Constructing Digital Signatures from a One-Way Function.
Technical Report SRI Intl. CSL 98, 1979.
2. R. Merkle. A Digital Signature based on a Conventional Encryption Function. Advances in Cryptology-Crypto '87. LNCS, vol.293, pp. 369–378, Springer-Verlag, 1988.
3. R. Merkle. A Certified Digital Signature. Advances in Cryptology-Crypto '89. LNCS, vol.435, pp. 218–238, Springer-Verlag, 1990.
4. S. Even, O. Goldreich, S. Micali. On-Line,/Off-Line Digital Signatures. J. of Cryptology, 9(1):35–67, 1996.
5. M. Bellare, S. Micali. How to Sign Given any Trapdoor Permutation. J. of the ACM, 39(1):214–233, 1992.
6. M. Naor, M. Yung. Universal One-Way Hash Functions and their Cryptographic Applications. Proceedings of STOC 1989, pp.33–43.
7. J. Rompel. One-Way Functions are Necessary and Sufficient for Secure Signatures. Proceedings of STOC 1990, pp.387–394.

Having thus described our invention, what we claim as new and desire to secure by Letters Patent is:

1. A method of creating a combined digital stream from an original stream of data which can be authenticated, said method comprising:
   a. decomposing said original stream into a plurality of original blocks;
   b. adding ancillary information to each of said original blocks to form a combined block for each original block, where said ancillary information is used to authenticate at least one of said original blocks of said original stream; and
   c. signing one of said combined blocks thereby forming said combined stream when said combined blocks are recombined, where later said ancillary information can be used in conjunction with ancillary information of other of said combined blocks to successively authenticate said original blocks of said original stream.

2. A method as recited in claim 1, wherein said ancillary information in each of said combined blocks of said stream is a hash of some corresponding combined block of said combined stream.

3. A method as recited in claim 1, wherein the number of bits in said ancillary information in each block is independent of the size of said stream.

4. A method as recited in claim 1, wherein said authenticating comprises establishing non-repudiably the sender of said stream by verifying the digital signature on one of said combined blocks.

5. A method of creating a combined digital stream from an original stream of data which can be authenticated, said method comprising:

decomposing said original stream into a plurality of original blocks;

adding ancillary information to each of said original blocks to form a combined block for each original block, where said ancillary information is used to authenticate at least one of said original blocks of said original stream; and signing one of said combined blocks thereby forming said combined stream when said combined blocks are recombined, where later said ancillary information can be used in conjunction with ancillary information of other of said combined blocks to successively authenticate said original blocks of said original stream, wherein said ancillary information is at least one of a one time public key and a one time signature of some combined block.

6. A method of creating a combined digital stream from an original stream of data which can be authenticated, said method comprising:

decomposing said original stream into a plurality of original blocks;

adding ancillary information to each of said original blocks to form a combined block for each original block, where said ancillary information is used to authenticate at least one of said original blocks of said original stream; and signing one of said combined blocks thereby forming said combined stream when said combined blocks are recombined, where later said ancillary information can be used in conjunction with ancillary information of other of said combined blocks to successively authenticate said original blocks of said original stream, wherein said ancillary information in some of said combined blocks is a hash of some said combined blocks, and wherein ancillary information in other of said combined blocks is a one time public key and one time signature of some of said combined blocks.

7. A method as recited in claim 6 wherein parts of said one time digital signatures are inserted into a plurality of said combined blocks.

8. A method of authenticating a combined stream of data, comprising:

decomposing said stream into a plurality of combined blocks, each of said combined blocks comprising consumable information and ancillary information;

establishing non-repudiably the sender of said stream by verifying a digital signature on one of said combined blocks; and authenticating some of said combined blocks by using ancillary information extracted from said authenticated combined blocks.

9. A method as recited in claim 8, wherein said ancillary information is a hash of some of said combined blocks and said combined blocks are authenticated by verifying the value of said hash.

10. A method of authenticating a combined stream of data, comprising:

decomposing said stream into a plurality of combined blocks, each of said combined blocks comprising consumable information and ancillary information;

authenticating one of said combined blocks by verifying a digital signature;

authenticating some of said combined blocks by using ancillary information extracted from said authenticated combined blocks, wherein said ancillary information comprises a one time public key and a one time signature, and wherein authentication of said combined blocks is performed by verifying said one time signature using said one time public key.

11. A method of authenticating a combined stream of data, comprising:

decomposing said stream into a plurality of combined blocks, each of said combined blocks comprising consumable information and ancillary information;

authenticating one of said combined blocks by verifying a digital signature;

authenticating some of said combined blocks by using ancillary information extracted from said authenticated combined blocks, wherein said ancillary information in each of said combined blocks comprises either a hash, at least a part of a one time public key and at least a part of a one time signature.

* * * * *